(12) United States Patent
Zabelka

(10) Patent No.: US 8,146,898 B2
(45) Date of Patent: Apr. 3, 2012

(54) ELASTOMERIC COMPRESSION SPRING

(75) Inventor: Scott E. Zabelka, Plainfield, IL (US)

(73) Assignee: Miner Elastomer Products Corporation, Geneva, IL (US)

( * ) Notice: Subject to any disclaimer, the term of this patent is extended or adjusted under 35 U.S.C. 154(b) by 312 days.

(21) Appl. No.: 12/590,636

(22) Filed: Nov. 12, 2009

(65) Prior Publication Data

US 2011/0109028 A1    May 12, 2011

(51) Int. Cl.
*F16F 1/00* (2006.01)
(52) U.S. Cl. ............... 267/70; 267/153; 267/220
(58) Field of Classification Search ............ 267/219, 267/220, 136, 153, 70, 161, 162, 142–145
See application file for complete search history.

(56) References Cited

U.S. PATENT DOCUMENTS

| | | | |
|---|---|---|---|
| 2,981,534 A | 4/1961 | Peras | |
| 3,118,659 A | 1/1964 | Paulsen | |
| 3,263,983 A | 8/1966 | Bliven | |
| 3,263,985 A | 8/1966 | Planta | |
| 3,402,924 A | 9/1968 | Rix | |
| 3,409,284 A | 11/1968 | Rix | |
| 3,412,990 A | 11/1968 | Gladstone | |
| 4,042,259 A | 8/1977 | Fiedler et al. | |
| 4,175,770 A | 11/1979 | Draisbach et al. | |
| 4,198,037 A | 4/1980 | Anderson | |
| 4,235,427 A | 11/1980 | Bialobrzeski | |
| 4,256,292 A | 3/1981 | Sullivan et al. | |
| 4,477,061 A | 10/1984 | Kawaura et al. | |
| 4,566,678 A | 1/1986 | Anderson | |
| 4,624,493 A | 11/1986 | Hillebrand et al. | |
| 4,651,977 A | 3/1987 | Buma | |
| 4,653,735 A | 3/1987 | Buma | |
| 4,673,171 A | 6/1987 | Buma | |
| 4,893,857 A | 1/1990 | Bobinger et al. | |
| 4,962,916 A | 10/1990 | Palinkas | |
| 5,000,215 A | 3/1991 | Philops | |
| 5,280,890 A | 1/1994 | Wydra | |
| 5,868,384 A | 2/1999 | Anderson | |
| 5,957,441 A | 9/1999 | Tews | |
| 6,170,782 B1 | 1/2001 | Barrier et al. | |
| 6,345,814 B1 * | 2/2002 | Lawson | ............ 267/70 |

OTHER PUBLICATIONS

International Searching Authority; PCT International Search Reportissued in connection with PCT/US2010/002799; Jan. 7, 2011; 2 pages.
International Searching Authority; Written Opinion of International Searching Authority issued in connection with with PCT/US2010/002799; Jan. 7, 2011; 5 pages.

* cited by examiner

*Primary Examiner* — Melanie Torres Williams
(74) *Attorney, Agent, or Firm* — Law Office of John W. Harbst

(57) ABSTRACT

An elastomeric compression including an elastomeric body defining a longitudinal axis and having two hollow convolutions between opposed ends of the spring. The convolutions are integrally formed and joined to each other by a connecting section. Each hollow convolution includes wall structure defining an outer surface for the spring. The wall structure of each convolution includes two angled wall sections disposed to opposed sides of the axis and which angle away from the connecting section and from each other. The outer surface of that portion of each angled wall section of each convolution adjacent to the connecting section has a projection extending outwardly from the outer surface. As such, and when the angled wall sections of one convolution collapse toward the angled wall sections of the other convolution, in response to a load being directed against the spring, the opposed projections on the convolutions contact and engage with each other thereby enhancing performance characteristics of the spring.

22 Claims, 4 Drawing Sheets

ELASTOMERIC COMPRESSION SPRING

FIELD OF THE INVENTION DISCLOSURE

This invention disclosure generally relates to compression springs, and, more particularly, to a compression spring formed from an elastomeric material.

BACKGROUND OF THE INVENTION DISCLOSURE

Compression springs formed from elastomeric material are well known in the art. Compression springs having a hollow spring body which are loaded in the axial direction of their bodies and generally parallel to their longitudinal axis are also known in the art. Such springs are typically arranged in end-to-end relation relative to each other to absorb loads applied thereto. Such springs are known to include adjoining convolutions having deformable wall structure which collapse upon each other in response to axial load being exerted against the spring.

The widespread use of such springs is due to a number of advantageous properties. Such springs have a progressive deformation characteristic which enables both very large and very small loads to be effectively absorbed without the springs being compressed fully solid even under large loads. The deformation of the spring is favorable so that a long spring deflection path in relation to its unloaded structural height can be achieved. Upon axial compression, wall structure of the adjoining convolutions come increasingly into contact with one another and thus can, ultimately, bear against each other.

One problem with such springs, especially when stacked relative to each other, relates to their relative poor lateral stability. Of course, when the wall thickness of the convolutions is reduced, the lateral stability of the springs suffers in proportion to the reduction in wall thickness. Accordingly, it is known to provide the hollow spring body with a centralized bore which extends the length of the body and opens at opposite ends to allow a guide rod or member to extend therethrough whereby adding to the stability of such a spring. Although helpful in adding to the lateral spring stability, lateral deflection of the spring ultimately remains a concern. Of course, and as the spring laterally deflects, the elastomeric material of the spring body tends to intermittently grab or grasp the rod passing through the spring thereby causing other problems and detracting from spring performance.

The danger of deficient lateral stability and therefore of lateral buckling of the spring is particularly great when the force or load acting on the spring is directed at an angle relative to the longitudinal axis of the spring. Moreover, and when such springs are stacked in axial relation relative to each other, the springs tend to rotate relative to each other and about the guide or rod passing through the spring thus adversely influencing overall spring performance.

Thus, there is a need and continuing desire for an elastomeric spring which obviates the disadvantages of known elastomeric spring designs and which particularly improves the lateral stability while at the same time retaining or even improving upon the favorable properties of known elastomeric springs.

SUMMARY OF THE INVENTION DISCLOSURE

According to one aspect, there is provided an elastomeric compression including an elastomeric body defining a longitudinal axis for the spring. The elastomeric body is formed with two hollow convolutions between opposed ends of the spring. The convolutions are integrally formed and joined to each other by a connecting section. Each hollow convolution includes wall structure defining an outer surface for the spring. The wall structure of each convolution includes two angled wall sections disposed to opposed sides of the axis and which angle away from the connecting section and from each other. The outer surface of that portion of each angled wall section of each convolution adjacent to the connecting section has a projection extending outwardly from the outer surface and effectively extending across each convolution. As such, and when the angled wall sections of one convolution collapse toward the angled wall sections of the other convolution in response to a load being directed against the spring, the opposed projections on the adjacent convolutions contact and engage with each other thereby enhancing performance characteristics of the spring.

In one form, the elastomeric body defines a bore which opens to opposed ends of and is arranged generally coaxial with the body. Preferably, the hollow wall structure of each convolution further includes an inner surface which is radially spaced from the outer surface of the wall structure by a generally constant distance except in those portions of the convolutions wherein the projections are provided for enhancing performance characteristics of the spring.

In a preferred form, each convolution of the elastomeric body has an elliptical cross-sectional shape when the spring is unloaded. In one embodiment, the elastomeric body is formed from a material having a molecular structure and a ratio of plastic strain to elastic strain greater than 1.5 to 1. In a preferred form, the elastomeric body is formed from a solid elastomer material having a Shore D hardness ranging between about 40 and about 72 durometer.

To further enhance spring performance, the elastomeric compression spring can further include structure for inhibiting the spring from inadvertently rotating about the axis of the spring. In one form, the structure for inhibiting rotation of the spring includes at least two free-ended projections extending axially from one end of the elastomeric body and two recesses formed at an opposed end of the elastomeric body for matingly receiving and accommodating free-ended projections axially extending from an axially adjacent spring.

According to another aspect, there is provided a compression spring including a one-piece elastomeric body defining a longitudinal axis for the spring and having a height between opposed first and second ends, a width, and a length. The elastomeric body has a generally rectangular profile in plan and is formed with two convolutions joined to each other by a connecting section. Each convolution has hollow wall structure defining an outer surface of the spring. The wall structure of each convolution includes two angled wall sections disposed to opposed sides of the longitudinal axis and which project away from the connecting section and from each other. The outer surface of that portion of each angled wall section of each convolution adjacent to the connecting section has a projection extending outwardly from the outer surface and effectively extending substantially the length of the body such that when the angled wall sections of one convolution collapse toward the angled wall sections of the adjacent convolution, in response to a load being directed along the longitudinal axis of the spring, the opposed projections on the convolutions contact and engage with each other thereby enhancing stability of the spring.

Preferably, the elastomeric body defines a bore which opens to the first and second ends of and is arranged generally coaxial with the body. In one form, the hollow wall structure of each convolution further includes an inner surface which is radially spaced from the outer surface of the wall structure by a generally constant distance except in those portions of the convolutions wherein the projections are provided for enhancing stability of the spring. In one embodiment, each convolution has an elliptical cross-sectional shape. In a preferred form, the elastomeric body is formed from a solid elastomer material having a Shore D hardness ranging between about 40 and about 72 durometer.

The elastomeric compression spring furthermore can include structure for inhibiting the spring from inadvertently rotating about the axis of the spring. In one form, the structure for inhibiting rotation of the spring includes at least two free-ended projections extending axially from the first end of the elastomeric body and two recesses formed at the second end of the elastomeric body for matingly receiving and accommodating free-ended projections axially extending from an axially adjacent spring.

According to another aspect, there is provided a compression spring including a unitary elastomeric body symmetrical about an axis extending parallel to the direction loads are applied to the spring. The elastomeric body has a generally rectangular configuration in plan. The elastomeric body is recompressed along the axis to a degree sufficient to cause the material thereof to exceed its yield point and give the spring a predetermined set of decreased axial dimension in an unloaded condition and impart resiliency thereto in an axial direction. The elastomeric body has an outer surface which is provided with two grooves extending lengthwise of the body and which are bounded by two convolutions which approach one another in response to axial compression of the body. The two convolutions are joined to each other by a connecting section. Each convolution has hollow wall structure including two wall sections disposed to opposed sides of the longitudinal axis and which angle away from the connecting section and each other. The outer surface of that portion of each angled wall section adjacent one of the grooves has a generally semi-circular projection extending from the outer surface of the respective convolution and substantially the length of the body such that when the angled walls of one convolution collapse toward the angled walls of the adjacent convolution, in response to a load being directed against the spring, the opposed projections on the convolutions contact and engage with each other thereby enhancing the stability of the spring.

In one form, the elastomeric body defines a bore which opens to first and second opposed ends of and is arranged generally coaxial with the elastomeric body. Preferably, the hollow wall structure of each convolution further includes an inner surface which is radially spaced from the outer surface of the wall structure by a generally constant distance except in those portions of the convolutions wherein the projections are provided for enhancing stability of the spring. In one embodiment, each convolution has a generally elliptical cross-sectional shape. In a preferred form, the elastomeric body is formed from a solid elastomer material having a Shore D hardness ranging between about 40 and about 72 durometer.

In a preferred form, the elastomeric compression spring further includes structure for inhibiting the spring from rotating about the axis in response to an axial load being imparted to the spring. In one form, the structure for inhibiting rotation of the spring includes at least two free-ended projections extending axially from one end of the elastomeric body and two recesses formed at an opposite end of the elastomeric body for matingly receiving and accommodating free-ended projections axially extending from an axially adjacent spring.

DETAILED DESCRIPTION

Figure 1:
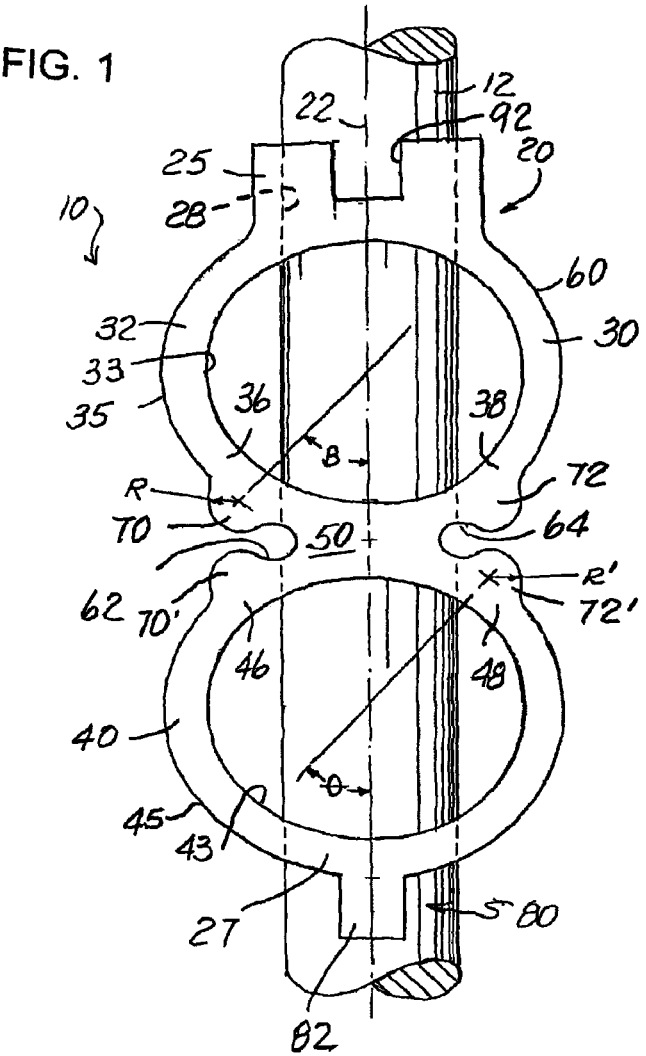
FIG. 1 is an enlarged front view of one form of elastomeric compression spring embodying principals of this invention disclosure.

While this invention disclosure is susceptible of embodiment in multiple forms, there is shown in the drawings and will hereinafter be described a preferred embodiment, with the understanding the present disclosure sets forth an exemplification of the disclosure which is not intended to limit the disclosure to the specific embodiment illustrated and described.

Referring now to the drawings, wherein like reference numerals indicate like parts throughout the several views, there is shown in FIG. 1 an elastomeric compression spring, generally identified by reference numeral 10 which embodies principals of this invention disclosure. In the illustrated embodiment, spring 10 is axially arranged about an elongated rod 12 and serves to absorb, dissipate and return loads applied to the spring 10. Spring 10 is formed from a unitary or one-piece elastomeric body 20 having a radial style geometry to provide a relative smooth lead into the loading curve as discussed below. The one-piece elastomeric body 20 defines a longitudinal axis 22 for the spring 10. Notably, axis 22 extends generally parallel to the direction loads are applied to the spring 10. In the illustrated embodiment, the unitary body 20 is formed generally symmetrical about axis 22.

Body 20 is preferably formed from of a solid elastomer material sold under the name Hytrel® by DuPont de Nemoirs and Company and which is described with more particularity in coassigned U.S. Pat. Nos. 4,198,037 and 4,566,678 to David G. Anderson; the applicable portions of which are incorporated herein by reference. Of course, other types of thermoplastic elastomers can equally suffice. In one form, the elastomer from which body 20 is formed has a Shore D hardness ranging between about 40 and about 72.

Preferably, body 20 is initially formed as preform. In one embodiment, such preform is molded using known injection molding or blow molding techniques. As more particularly described in the afore-mentioned U.S. patents, and after forming the preform, it is initially and axially precompressed along its longitudinal axis by more than 30% to 40% of the initial height of the preform or to a degree sufficient to cause the elastomer from which body 20 is formed to exceed its yield point. Upon release of the initial set, the elastomeric body 20 returns to a stable length which is shorter the original or initial length of the preform. Suffice it to say, and as explained in the afore-mentioned patents, as a result of the precompression of the perform, the elastomeric body 20 has resilient characteristics along with an oriented molecular structure and a ratio of plastic strain to elastic strain greater than 1.5 to 1.

Figure 2:
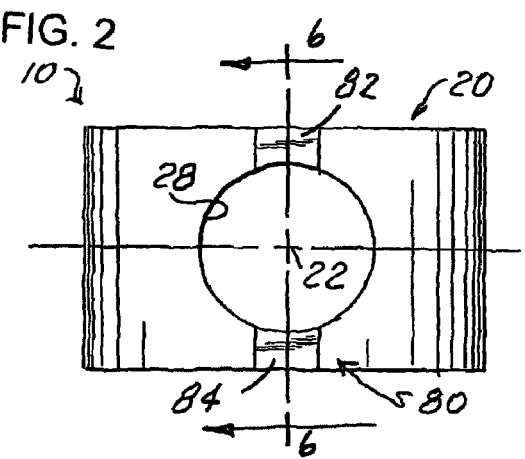
FIG. 2 is a bottom plan view of the compression spring illustrated in FIG. 1.
Figure 3:
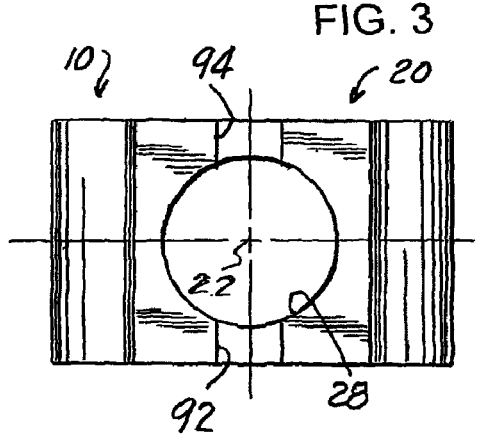
FIG. 3 is a top plan view of the compression spring illustrated in FIG. 1.
Figure 4:
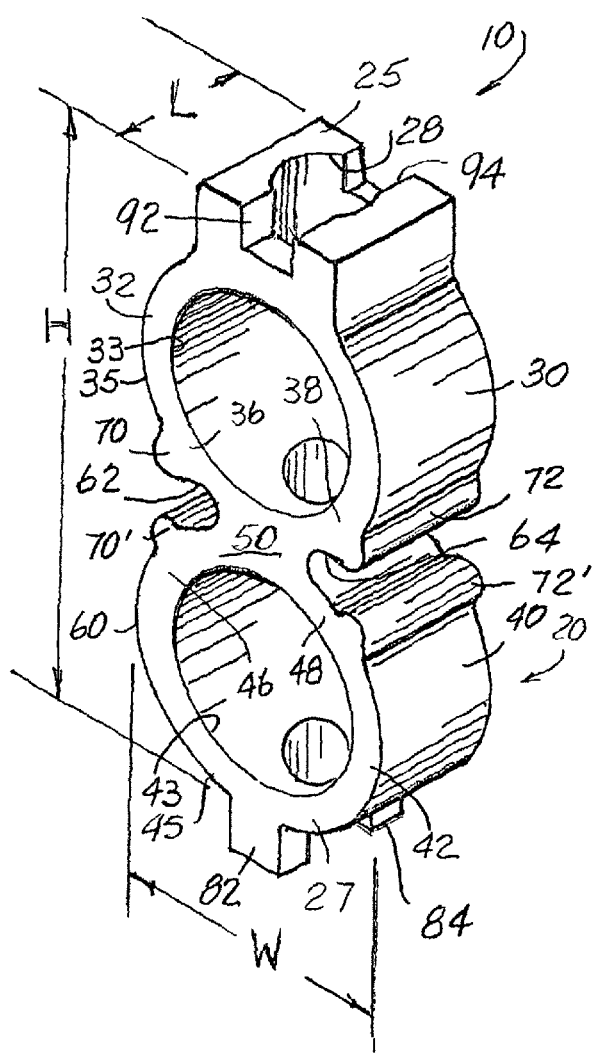
FIG. 4 is a perspective view of the compression spring illustrated in FIG. 1.

As shown in FIGS. 2 and 3, the elastomeric body 20 has a generally rectangular configuration in plan. As shown in FIG. 4, the elastomeric body 20 has a predetermined H between axially separated and aligned ends 25 and 27, a predetermined width W, and predetermined length L prescribed by the space envelope requirements of the particular application wherein the spring 10 is to be used. Between the opposed ends 25 and 27, the elastomeric body 20 is formed with two hollow convolutions or lobes 30 and 40 which are joined to each other by a bridge or connecting section 50. In the illustrated embodiment, the hollow convolutions or lobes 30, 40 are substantially identical relative to each other but is should be appreciated that with some simple redesign efforts the convolutions 30, 40 could have different configurations relative to each other without detracting or departing from the spirit and scope of this invention disclosure. In the embodiment illustrated in FIG. 1, each convolution 30, 40 of spring 10 has a generally elliptical shape in cross-section.

As shown in FIGS. 1, 4, 5 and 6, the elastomeric body 20 further defines a bore 28 opening to the opposed ends 25 and 27 and which extends through the bridge or connecting section 50. The bore 28 has a closed margin 29 defined by portions of the elastomeric body 20. Notably, the bore 28 is arranged generally coaxial with the longitudinal axis 22 of the spring 10. In the embodiment illustrated in FIG. 1, bore 28 is of sufficient diameter to accommodate passage of the rod 12 extend endwise through the spring 10.

Each convolution 30 and 40 of the elastomeric body 20 includes hollow wall structure 32 and 42, respectively, extending from the center section 50 and which combine with each other to define an outer surface 60 for the spring 10. Moreover, and as shown in FIGS. 4 and 6, the outer surface 60 of spring 10 defines two open-sided grooves or channels 62 and 64 (with only channel 64 being shown in FIG. 5) which extend the length L of the elastomeric body 20 and which are bounded by the two convolutions 30, 40 of spring 10 which approach one another in response to axial compression of the spring 10.

As shown in FIG. 1, the hollow wall structure 32 of convolution 30 has an inner surface 33 and an outer surface 35. The hollow wall structure 32 of convolution 30 further includes two angled wall sections 36 and 38 which are disposed to opposed sides of the longitudinal axis 22 of spring 10. As shown in FIG. 1, the angled wall sections 36 and 38 of convolution 30 have an arcuate configuration. Moreover, and as illustrated in FIG. 1, the angled wall sections 36 and 38 of convolution 30 project or angle away from the connecting section 50 and from each other.

Similarly, the hollow wall structure 42 of convolution 40 has an inner surface 43 and an outer surface 45 which are spaced a relatively constant and predetermined distance apart from each other from a major portion of the hollow wall structure 42. The hollow wall structure 42 of convolution 30 further includes two angled wall sections 46 and 48 which are disposed to opposed sides of the longitudinal axis 22 of spring 10. As shown in FIG. 1, the angled wall sections 46 and 48 of convolution 40 have an arcuate configuration. Moreover, and as shown in FIG. 1, the angled wall sections 46 and 48 of convolution 40 project or angle away from the connecting section 50 and from each other.

Spring 10 furthermore embodies performance enhancing geometry to control the motion of the convolutions 30, 40 as the spring 10 experiences close-out. As will be appreciated, by controlling the motion of the convolutions 30, 40, the geometry of the spring 20 influences the loading characteristics of the spring 10 thereby enhancing performance of spring 10.

Such performance enhancing geometry involves providing the outer surface of each convolution 30 and 40 with a pair of nodules or projections 70, 72 and 70', 72', respectively, on opposed sides of the axis 22 of the spring 20 in the area of the respective wall sections and adjacent to the grooves 62, 64, respectively. In one form, the nodules or projections 70, 72 and 70', 72' have a transversely elongated configuration and are located on the respective convolutions 30, 40 such that they contact and operably engage with each other when the opposing wall sections of the respective convolutions 30, 40 collapse toward each other in response to a sufficient axial load being applied to the spring 10 whereby making the spring 10 more stable. By adding to the lateral stability thereof, spring 10 is inhibited from inadvertently grasping or otherwise engaging with the rod 12 passing therethrough thereby adding to overall spring performance. As shown in FIG. 1, each projection 70, 72 and 70', 72', effectively increases the thickness of the hollow wall structure of the respective convolution in the limited area of such nodule or projection 70, 72 and 70', 72' and when opposed projections 70, 70' and 72, 72' engage with each other they furthermore serve to limit radial expansion of the convolutions 30, 40 to furthermore enhance spring performance.

In the illustrated embodiment, each transversely elongated nodule or projection 70, 72 extends substantially the entire length L of the convolution 30. As shown in FIG. 1, each projection 70, 72 preferably has a generally semi-circular outer configuration whereby allowing the opposed projections 70, 70' and 72, 72' to be self-aligning relative to each other. In a preferred form, each projection 70, 72 has a radius R generally equal to about the distance between the inner surface 33 and outer surface 35 of convolution 30.

Preferably, when the preform for the spring body 20 is molded, each projection 70, 72 is formed thereon. Moreover, and when spring body 20 is molded, each projection 70, 72 is arranged on the outer surface 35 of the convolution 30 in proximity to the respective open-sided channel 62, 64 such that an included angle β is established between the each projection 70, 72 and the longitudinal axis 22 of the spring 10. Preferably, the included angle β established between the each projection 70, 72 and the longitudinal axis 22 of the spring 10 can range between about 35° and about 55° depending upon the desired spring rate or performance for spring 10. In a most preferred form, the included angle β established between the each projection 70, 72 and the longitudinal axis 22 of the spring 10 is about 45°.

Similarly, and in the illustrated embodiment, each elongated nodule or projection 70', 72' transversely extends substantially the entire length L of the convolution 40. As shown in FIG. 1, each projection 70', 72' has a generally semi-circular outer configuration. In a preferred form, each projection 70', 72' has a radius R' generally equal to about the distance between the inner surface 43 and outer surface 45 of convolution 40.

Preferably, when the preform for the spring body 20 is molded, each projection 70', 72' is formed thereon. Moreover, and when spring body 20 is molded, each projection 70', 72' is arranged on the outer surface 45 of the convolution 30 in proximity to the respective open-sided channel 62, 64 such that an included angle θ is established between the each projection 70', 72' and the longitudinal axis 22 of the spring 10. Preferably, the included angle θ established between the each projection 70', 72' and the longitudinal axis 22 of the spring 10 can range between about 35° and about 55° depending upon the desired spring rate performance for spring 10. In a most preferred form, the included angle θ established between the each projection 70, 72 and the longitudinal axis 22 of the spring 10 is about 45°.

As mentioned above, a spring like that illustrated in the drawings is frequently arranged in operable and axial alignment with one or more like springs. As such, and when an axial load is applied thereto, the stacked springs tend to rotate about their longitudinal axis thus detracting from their ability to perform to their maximum capability. As such, spring 10 is furthermore preferably provided with structure 80 for inhibiting spring 10 from rotating about its axis 22 when an axial load is applied thereto. The structure 80 for inhibiting spring 10 from rotating about its axis 22 can take a myriad of various designs without detracting or departing from the spirit and scope of this invention disclosure.

Figure 5:
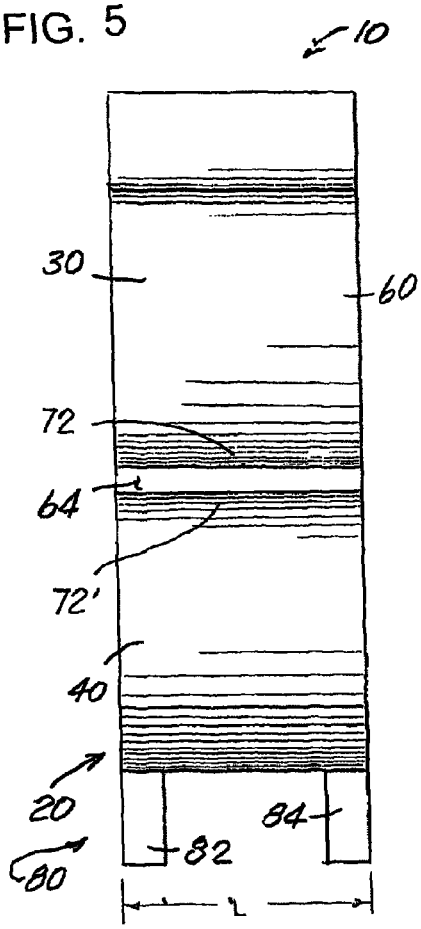
FIG. 5 is a side view of the compression spring illustrated in FIG. 1.
Figure 6:
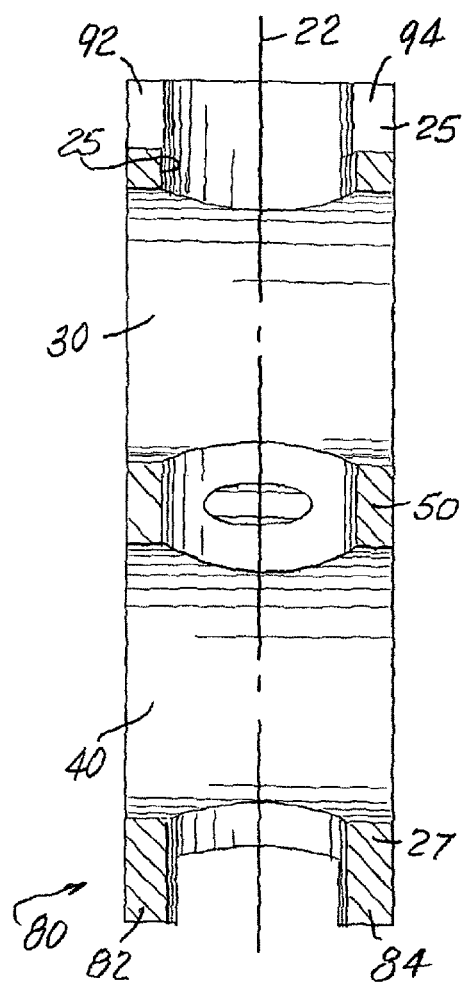
FIG. 6 is a cross-sectional view taken along line 6-6 of FIG. 2.
Figure 7:
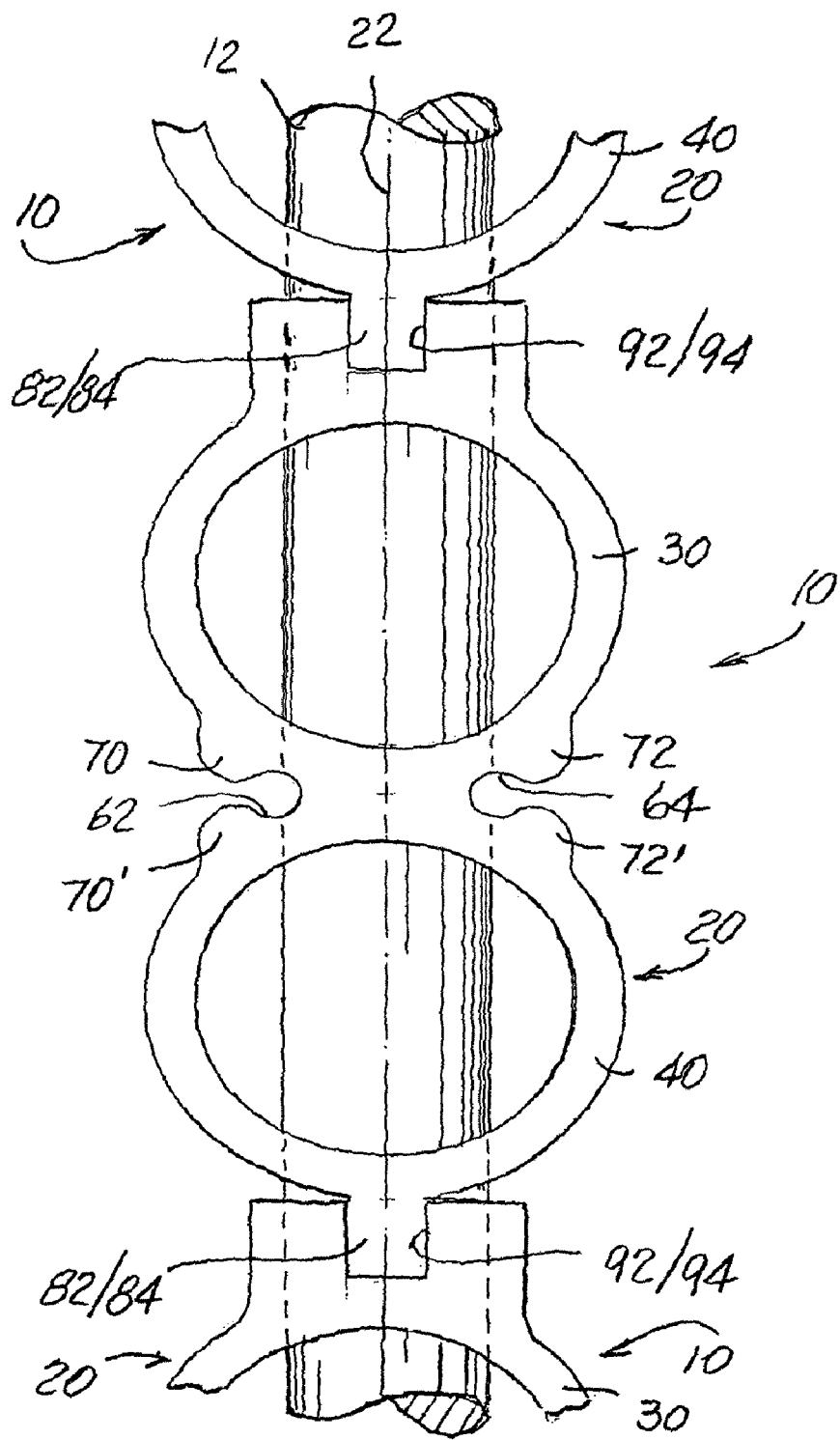
FIG. 7 is a fragmentary showing of two springs embodying principals of this invention disclosure arranged in end-to-end relation relative to each other.

In the form illustrated by way of example in FIGS. 2, 5 and 6, the structure 80 for inhibiting spring 10 from rotating about its axis 22 when an axial load is applied thereto includes two free-ended projections 82 and 84 extending axially from one end of the elastomeric body 20. Moreover, and as shown in FIGS. 4 and 6, the structure 80 for inhibiting spring 10 from rotating about its axis 22 when an axial load is applied thereto includes two open-ended recesses 92 and 94 formed at an opposite end of the elastomeric body 20. As illustrated by way of example in FIG. 7, the recesses 92, 94 defined toward one end of spring 10 are configured to and matingly receive and accommodate the free-ended projections extending from an axially adjacent elastomeric compression spring. As such, the stacked springs are inhibited from rotating relative to each other and about their longitudinal axis thereby maximizing their performance capabilities.

During operation, and when an axial load is directed against spring 10, the lobes or convolutions 30 and 40 are compressed toward each other with the outer surfaces 35 and 45 of the convolutions 30 and 40, respectively, rolling one upon the other. As a result, and after the open-sided channels to grooves 62, 64 close-out or collapse, the opposed projections 70, 70' and 72, 72' on the convolutions 30 and 40, respectively, come into contact with each other. As the convolutions 30, 40 of the spring continue to collapse one upon the other in response to an axial load being applied to the spring, the nodules or projections 70, 72 and 70', 72' serve to provide lateral stability to the spring 10 thereby enhancing spring performance and capability.

Figure 8:
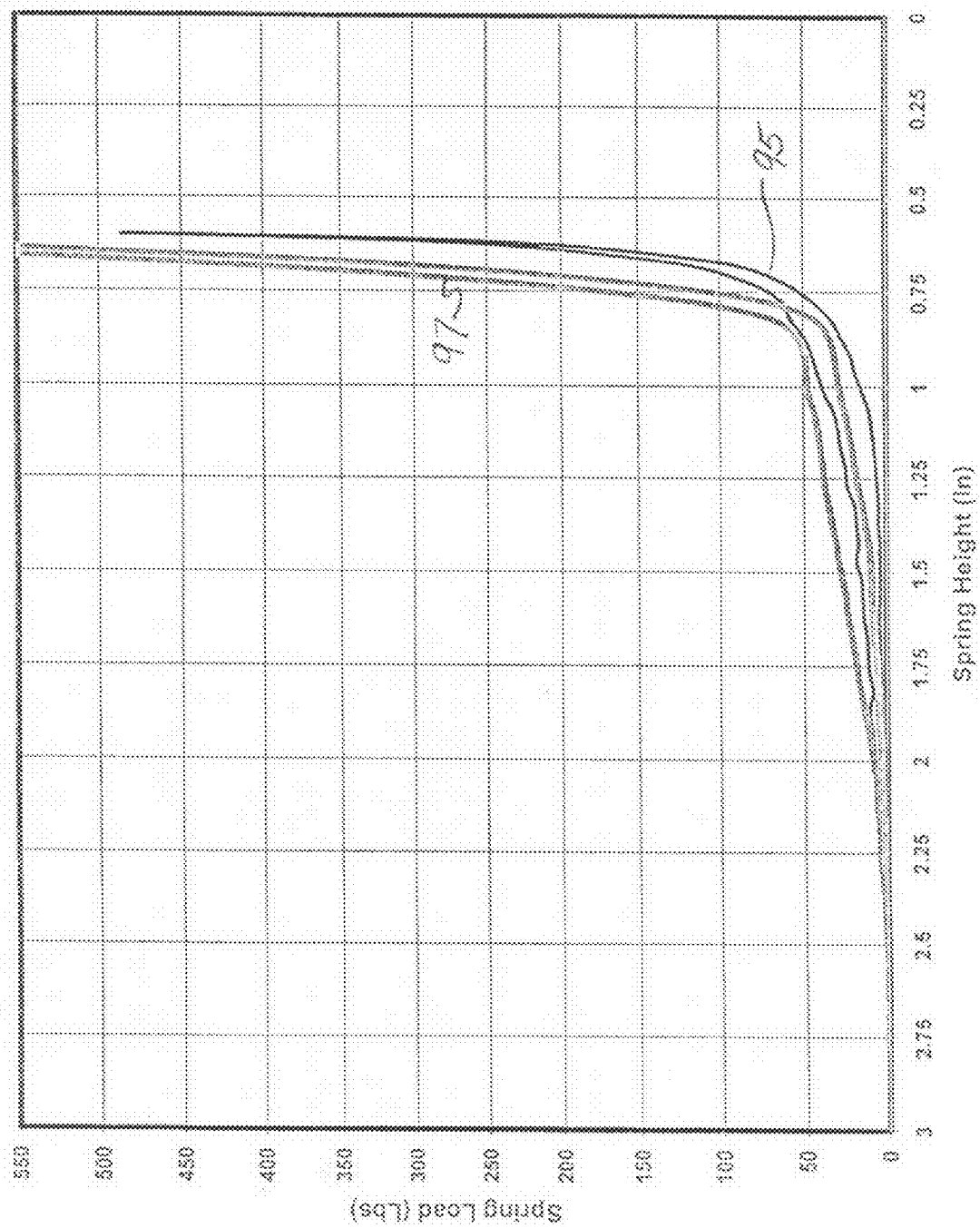
FIG. 8 is a schematic load deflection graph showing the performance characteristics of an elastomeric compression spring embodying principals of this invention disclosure against a comparable elastomeric compression spring.

Some of the advantages obtainable with an elastomeric compression spring embodying the structure and features mentioned above regarding spring 10 are evidenced from the schematic showings in FIG. 8. Line 95 in FIG. 8 schematically represents the capabilities and performance of an elastomeric compression spring similar to that discussed above but which is free of or without any projections or nodules on the adjoining convolutions thereof. It is important to note the undulations in Line 95 during the initial stages of axial compression of the spring representing lateral instability of the spring. Line 97 in FIG. 8 schematically represents the enhanced end-load capabilities and performance of an elastomeric compression spring formed from an elastomer having like qualities to the spring whose performance is illustrated by line 95 but which embodies the principals and teachings of the above disclosure. Line 97 shows the relatively smooth lead into the loading curve associated with a spring which embodies the principals and teachings of the above disclosure. The other performance differences and variations in capability between the two springs is apparent. Moreover, it should be appreciated, the exact geometry and placements of the nodules or projections 70, 72 and 70', 72' on the convolutions 30 and 40 of spring 10 can specifically and advantageously be tailored to the needs of the specific spring application.

From the foregoing, it will be observed that numerous modifications and variations can be made and effected without departing or detracting from the true spirit and novel concept of this invention disclosure. Moreover, it will be appreciated, the present disclosure is intended to set forth exemplifications which are not intended to limit the disclosure to the specific embodiments illustrated. Rather, this disclosure is intended to cover by the appended claims all such modifications and variations as fall within the spirit and scope of the claims.

What is claimed is:

1. An elastomeric compression spring, comprising:
an elastomeric body defining a longitudinal axis for said spring, with said elastomeric body being formed with two hollow convolutions between opposed ends of said spring, with the convolutions being integrally formed and joined to each other by a connecting section, with each hollow convolution including wall structure defining an outer surface for said spring, and with the wall structure of each convolution including two angled wall sections disposed to opposed sides of said axis and which angle away from said connecting section and from each other, and with the outer surface of that portion of each angled wall section of each convolution adjacent to the connecting section having a transversely elongated projection extending outwardly from said outer surface of said spring such that when the angled wall sections of one convolution collapse toward the angled wall sections of the other convolution in response to a load being directed along the longitudinal axis of said spring the projections on said convolutions contact and engage with each other thereby enhancing performance characteristics of said spring.

2. The elastomeric compression spring according to claim 1, wherein said elastomeric body defines a bore which opens to opposed ends of and is arranged generally coaxial with said body.

3. The elastomeric compression spring according to claim 1, wherein the hollow wall structure of each convolution defined by said elastomeric body further includes an inner surface which is radially spaced from the outer surface of said wall structure by a generally constant distance except in those portions of said convolutions wherein said projections are provided for enhancing performance characteristics of said spring.

4. The elastomeric compression spring according to claim 1, wherein each convolution of said elastomeric body has an elliptical cross-sectional shape.

5. The elastomeric compression spring according to claim 1, wherein said elastomeric body is formed from a material with a molecular structure and has a ratio of plastic strain to elastic strain greater than 1.5 to 1.

6. The elastomeric compression spring according to claim 1, wherein said elastomeric body is formed from a solid elastomer material having a Shore D hardness ranging between about 40 and about 72 durometer.

7. The elastomeric compression spring according to claim 1, further including structure for inhibiting said spring from rotating about said axis in response to an axial load being imparted to said spring.

8. The elastomeric compression spring according to claim 7, wherein the structure for inhibiting rotation of said spring includes at least two free-ended projections extending axially from one end of said elastomeric body and two recesses formed at an opposed end of said elastomeric body for matingly receiving and accommodating free-ended projections axially extending from an axially adjacent spring.

9. An elastomeric compression spring, comprising:

a one-piece elastomeric body defining a longitudinal axis for said spring and having a height between opposed first and second ends, a width, and a length, with said elastomeric body having a generally rectangular profile in plan and is formed with two convolutions which are joined to each other by a connecting section, with each convolution having hollow wall structure defining an outer surface of said spring, with the wall structure of each convolution including two angled wall sections disposed to opposed sides of said longitudinal axis and which project away from said connecting section and from each other, with the outer surface of that portion of each angled wall section of each convolution adjacent to the connecting section having a projection extending outwardly from said outer surface and extending substantially the length of said body such that when the angled wall sections of one convolution collapse toward the angled wall sections of the other convolution in response to a load being directed along the longitudinal axis of said spring the projections on said convolutions contact and engage with each other thereby enhancing stability of said spring.

10. The elastomeric compression spring according to claim 9, wherein said elastomeric body defines a bore which opens to the first and second ends of and is arranged generally coaxial with said body.

11. The elastomeric compression spring according to claim 9, wherein the hollow wall structure of each convolution defined by said elastomeric body further includes an inner surface which is radially spaced from the outer surface of said wall structure by a generally constant distance except in those portions of said convolutions wherein said projections are provided for enhancing stability of said spring.

12. The elastomeric compression spring according to claim 9, wherein each convolution of said elastomeric body has an elliptical cross-sectional shape.

13. The elastomeric compression spring according to claim 9, wherein said elastomeric body is formed from a solid elastomer material having a Shore D hardness ranging between about 40 and about 72 durometer.

14. The elastomeric compression spring according to claim 9, further including structure for inhibiting said spring from rotating about said axis in response to an axial load being imparted to said spring.

15. The elastomeric compression spring according to claim 14, wherein the structure for inhibiting rotation of said spring includes at least two free-ended projections extending axially from the first end of said elastomeric body and two recesses formed at the second end of said elastomeric body for matingly receiving and accommodating free-ended projections axially extending from an axially adjacent spring.

16. An elastomeric compression spring, comprising:

a unitary elastomeric body symmetrical about an axis extending parallel to the direction loads are applied to the spring, with said body having a generally rectangular configuration in plan, and with said elastomeric body being precompressed along said axis to a degree sufficient to cause the material thereof to exceed its yield point and give said spring a predetermined set of decreased axial dimension in an unloaded condition and impart resiliency thereto in an axial direction, said elastomeric body having an outer surface, with said outer surface being provided with two grooves extending lengthwise of said body and which are bounded by two convolutions which approach one another in response to axial compression of said body, and wherein said two convolutions are joined to each other by a connecting section, with each convolution having hollow wall structure including two wall sections disposed to opposite sides of said longitudinal axis and which angle away from said connecting section and from each other, with the outer surface of that portion of each angled wall section adjacent one of said grooves having a generally semi-circular projection extending outwardly from the outer surface of the respective convolution and substantially the length of said body such that when the angled walls of one convolution collapse toward the angled walls of the other convolution in response to a load being directed along the longitudinal axis of said spring the projections on said convolutions contact and engage with each other thereby enhancing the stability of said spring.

17. The elastomeric compression spring according to claim 16, wherein said elastomeric body defines a bore which opens to first and second opposed ends of and is arranged generally coaxial with said body.

18. The elastomeric compression spring according to claim 16, wherein the hollow wall structure of each convolution defined by said elastomeric body further includes an inner surface which is radially spaced from the outer surface of said wall structure by a generally constant distance except in those portions of said convolutions wherein said projections are provided for enhancing stability of said spring.

19. The elastomeric compression spring according to claim 16, wherein each convolution of said elastomeric body has a generally elliptical cross-sectional shape.

20. The elastomeric compression spring according to claim 16, wherein said elastomeric body is formed from a solid elastomer material having a Shore D hardness ranging between about 40 and about 72 durometer.

21. The elastomeric compression spring according to claim 16, further including structure for inhibiting said spring from rotating about said axis in response to an axial load being imparted to said spring.

22. The elastomeric compression spring according to claim 21, wherein the structure for inhibiting rotation of said spring includes at least two free-ended projections extending axially from one end of said elastomeric body and two recesses formed at an opposite end of said elastomeric body for matingly receiving and accommodating free-ended projections axially extending from an axially adjacent spring.

* * * * *